United States Patent
Breedvelt et al.

(10) Patent No.: US 12,549,670 B2
(45) Date of Patent: Feb. 10, 2026

(54) PROVIDING CONTEXT FOR COLLABORATIVE DOCUMENT

(71) Applicant: International Business Machines Corporation, Armonk, NY (US)

(72) Inventors: Ilse Breedvelt, Manotick (CA); Edwin Peter John Moffatt, Hursley Park (GB); Ellen R. Kolsto, Austin, TX (US); Troy Gregory Bjerke, Travis, TX (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 18/339,308

(22) Filed: Jun. 22, 2023

(65) Prior Publication Data
US 2024/0430364 A1    Dec. 26, 2024

(51) Int. Cl.
H04M 3/56 (2006.01)
G06Q 10/101 (2023.01)
G10L 15/18 (2013.01)

(52) U.S. Cl.
CPC .......... H04M 3/568 (2013.01); G06Q 10/101 (2013.01); G10L 15/18 (2013.01)

(58) Field of Classification Search
CPC ........ H04M 3/568; H04M 3/567; H04M 3/56; G06Q 10/101; G06Q 10/00; G10L 15/18; G10L 15/00; G06F 40/166; G06F 16/93; G06F 40/197; G06F 40/169; G06F 3/0482; G06F 3/04842; G06F 3/0484; G06F 3/0481; G06F 16/176
See application file for complete search history.

(56) References Cited

U.S. PATENT DOCUMENTS

| | | | |
|---|---|---|---|
| 6,119,147 A * | 9/2000 | Toomey | G06Q 10/109 719/329 |
| 8,111,282 B2 | 2/2012 | Cutler | |
| 8,754,925 B2 | 6/2014 | Ng | |
| 9,148,394 B2 | 9/2015 | Lynch | |
| 9,652,113 B1 | 5/2017 | Colson | |
| 10,467,298 B2 * | 11/2019 | Mullins | G06F 16/316 |
| 11,275,891 B2 * | 3/2022 | Mertens | G10L 15/08 |

(Continued)

OTHER PUBLICATIONS

Ehlen et al., "Meeting Adjourned: Off-line Learning Interfaces for Automatic Meeting Understanding", Proceedings of the 13th international Conference on Intelligent User Interfaces, IUI'08, Maspalomas, Gran Canaria, Spain, Jan. 13-16, 2008, 9 Pages.

(Continued)

*Primary Examiner* — Akelaw Teshale
(74) *Attorney, Agent, or Firm* — Edward J. Wixted, III

(57) ABSTRACT

According to one embodiment, a method, computer system, and computer program product for providing context regarding a shared document is provided. The embodiment may include identifying a shared document. The embodiment may also include initiating a live meeting. The embodiment may further include identifying verbal content in the live meeting. The embodiment may also include identifying one or more changes to the shared document. The embodiment may further include matching a portion of verbal content to a relevant change in the one or more changes to the shared document. The embodiment may also include providing contextual information to a user based on the matching.

20 Claims, 2 Drawing Sheets

(56) References Cited

U.S. PATENT DOCUMENTS

| | | | | |
|---|---|---|---|---|
| 11,354,920 | B2* | 6/2022 | Beller | G06F 40/279 |
| 11,681,819 | B1* | 6/2023 | Surazski | G06F 16/9535 |
| | | | | 726/28 |
| 12,057,954 | B2* | 8/2024 | Nagesh | H04L 12/1822 |
| 2009/0192845 | A1* | 7/2009 | Gudipaty | G06F 3/04842 |
| | | | | 715/733 |
| 2014/0180667 | A1* | 6/2014 | Johansson | G06F 40/58 |
| | | | | 704/235 |
| 2015/0100503 | A1* | 4/2015 | Lobo | G06Q 10/103 |
| | | | | 705/301 |
| 2018/0131731 | A1* | 5/2018 | Jones | H04L 65/1059 |
| 2019/0075146 | A1* | 3/2019 | Nikolaou | H04L 65/4015 |
| 2019/0258704 | A1* | 8/2019 | Mertens | G10L 15/22 |
| 2019/0259387 | A1* | 8/2019 | Mertens | G10L 15/197 |
| 2020/0133922 | A1* | 4/2020 | Tung | G06F 9/54 |
| 2020/0321007 | A1* | 10/2020 | Stoker | G10L 15/26 |
| 2022/0014582 | A1* | 1/2022 | Brodkowitz | H04L 67/125 |
| 2022/0222625 | A1* | 7/2022 | Haramati | G06F 3/04847 |
| 2023/0032159 | A1* | 2/2023 | Kalinichenko | H04L 12/1831 |
| 2023/0244802 | A1* | 8/2023 | Paul | G06F 16/176 |
| | | | | 707/608 |
| 2023/0281568 | A1* | 9/2023 | Logan | G06Q 10/109 |
| | | | | 705/7.19 |
| 2023/0394440 | A1* | 12/2023 | Marshall | G06F 16/93 |
| 2024/0039969 | A1* | 2/2024 | Jang | H04L 65/403 |
| 2024/0040083 | A1* | 2/2024 | Ryskamp | G06F 40/166 |
| 2024/0056553 | A1* | 2/2024 | Brudy | G06Q 10/101 |
| 2024/0146559 | A1* | 5/2024 | Ramoutar | H04L 12/1822 |
| 2024/0176960 | A1* | 5/2024 | Maurer | G06F 16/345 |
| 2024/0205037 | A1* | 6/2024 | Callegari | H04L 12/1831 |

OTHER PUBLICATIONS

Gewirtz, David, "Are you talking about me? How to get alerted when your name is used online", ZDNET, Mar. 20, 2017, 45 Pages.

Girgensohn et al., "Guiding Users through Asynchronous Meeting Content with Hypervideo Playback Plans", Proceedings of the 27th ACM Conference on Hypertext and Social Media, HT '16, Halifax, NS, Canada, Jul. 10-13, 2016, 11 Pages.

Meetingbooster, "Managing Meeting Action Items", MeetingBooster by MatchWare, 2023, 7 Pages.

Microsoft, "Microsoft Teams Instant Messaging", Microsoft, 2023, 5 Pages.

Nathan et al., "In Case You Missed It: Benefits of Attendee-Shared Annotations for Non-Attendees of Remote Meetings" Proceedings of the ACM 2012 Conference on Computer Supported Cooperative Work, CSCW'12, Seattle, Washington, USA, Feb. 11-15, 2012, 10 Pages.

Slack, "Customize your notifications in Slack", Slack Technologies, 2023, 4 Pages.

Wolock, Lia, "Race and Media Activism", University of Wisconsin-Milwaukee, 2021, 16 Pages.

Yankelovich et al., "Meeting Central: Making Distributed Meetings More Effective", Proceedings of the 2004 ACM Conference on Computer Supported Cooperative Work, vol. 6, Issue 3, 2004, 10 Pages.

* cited by examiner

PROVIDING CONTEXT FOR COLLABORATIVE DOCUMENT

BACKGROUND

The present invention relates generally to the field of computing, and more particularly to web collaboration.

The modern internet is the foundation of a wide variety of collaboration technologies. Web collaboration tools allow users to converse, meet, play, and otherwise collaborate across vast distances. Web collaboration tools include chat tools, tools for meetings and calls, cloud services, social networks, or document sharing tools. Such document sharing tools allow users to create, plan, write, draw, edit, and build a document together, often at the same time.

SUMMARY

According to one embodiment, a method, computer system, and computer program product for providing context regarding a shared document is provided. The embodiment may include identifying a shared document. The embodiment may also include initiating a live meeting. The embodiment may further include identifying verbal content in the live meeting. The embodiment may also include identifying one or more changes to the shared document. The embodiment may further include matching a portion of verbal content to a relevant change in the one or more changes to the shared document. The embodiment may also include providing contextual information to a user based on the matching.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
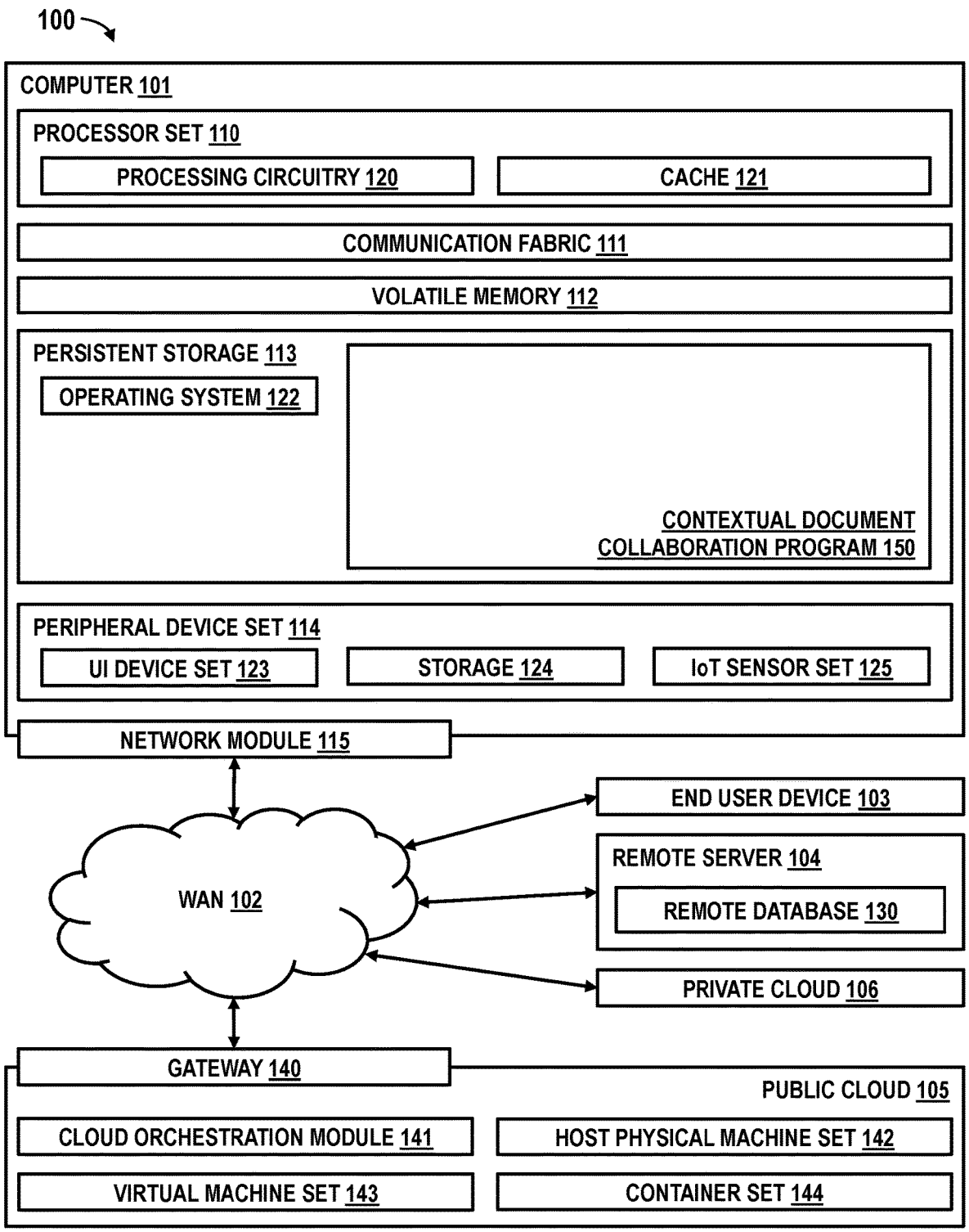
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web collaboration. The following described exemplary embodiments provide a system, method, and program product to, among other things, provide context for a collaborative document based on a meeting. Therefore, the present embodiment has the capacity to improve the technical field of web collaboration by providing context to users who missed a meeting, allowing for more seamless collaboration.

As previously described, web collaboration tools allow users to converse, meet, play, and otherwise collaborate across vast distances. Web collaboration tools include chat tools, tools for meetings and calls, cloud services, social networks, or document sharing tools. Such document sharing tools allow users to create, plan, write, draw, edit, and build a document together, often at the same time.

Communication and organization are crucial for many users to be able to edit one document together. Users may meet or converse with one another in order to plan or explain edits, providing context to the team for everything in the shared document. However, some users may not be present for, or may otherwise miss, the relevant context surrounding important edits. As such, it may be advantageous to, among other things, match context from a meeting to changes made to a shared document during the meeting.

According to one embodiment, a document collaboration program provides context for a shared document. The document collaboration program may identify a shared document, such as a text document, canvas document, or a spreadsheet. The document collaboration program may initiate a live meeting and identify verbal content in the live meeting. The document collaboration program may then match, correlate, or synchronize verbal content to changes in the shared document. The document collaboration program may finally provide context to users.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as contextual document collaboration program 150. In addition to contextual document collaboration program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and contextual document collaboration program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in contextual document collaboration program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in contextual document collaboration program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The contextual document collaboration program 150 may identify a shared document, such as a text document, canvas document, or a spreadsheet. The contextual document collaboration program 150 may then initiate a live meeting and identify verbal content in the live meeting. The contextual document collaboration program 150 may match, correlate, or synchronize verbal content to changes in the shared document. Contextual document collaboration program 150 may then provide contextual information to users.

Furthermore, notwithstanding depiction in computer 101, contextual document collaboration program 150 may be stored in and/or executed by, individually or in any combination, end user device 103, remote server 104, public cloud 105, and private cloud 106. The event streaming method is explained in more detail below with respect to FIG. 2.

Figure 2:
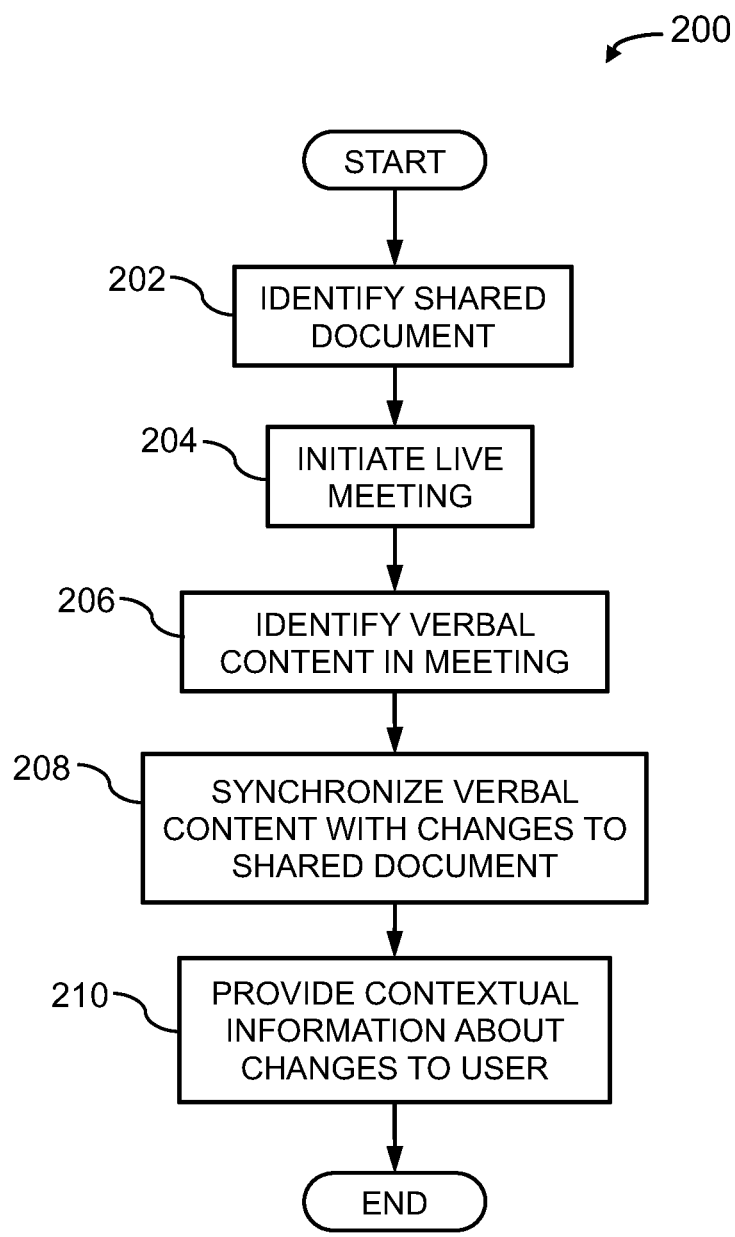
FIG. 2 illustrates an operational flowchart for a process for providing context for a collaborative document.

Referring now to FIG. 2, an operational flowchart for a process for providing context for changes to a shared document 200 is depicted according to at least one embodiment. At 202, the contextual document collaboration program 150 identifies a shared document. A shared document may be identified by user input or by an algorithmic process. A shared document may be, for example a text document, spreadsheet, presentation, graphical document, or canvas document. In alternate embodiments, the contextual document collaboration program 150 may identify other shared assets, such as a private social network or shared spaces in a video game, shared social space, or virtual reality platform.

In at least one embodiment, a shared document may be identified by user input. For example, a user, administrator, moderator, presenter, call participant, support agent, or technician may mark a file in a cloud service as a shared document. Alternatively, user input may include selecting a document from a user's file system, or a list of recent documents on a user's machine.

In another embodiment, a shared document may be identified by an algorithmic process. For example, an algorithmic process may note that, at the initiation of the call at 204, a presenter user opens a shared canvas document, and may identify that shared canvas document as the shared document. Alternatively, an algorithmic process may use natural language processing of a meeting title or meeting agenda alongside a process of artificial intelligence with a trained neural network to determine which files are most relevant to the call.

The contextual document collaboration program 150 may identify one or more documents, and may identify a new document over the course of a call, or while processing the context of a call after the call ends. The contextual document collaboration program 150 may identify files through a combination of algorithmic and manual methods. The contextual document collaboration program 150 may further provide or ensure access to relevant users, either through user input or automated means.

In at least one embodiment, a document may be a text document, spreadsheet, presentation, graphical document (such as an image), a video document, an audio document, or any other file that users may share and edit collaboratively. For more specific examples, a document may include a contract several users are negotiating, a budget spreadsheet, or a poster several users are designing.

In a preferred embodiment, a document is a canvas document, whiteboard document, or similar shared space, such as the documents users collaborate on using services such as Mural® (Mural and all Mural-based trademarks and logos are trademarks or registered trademarks of Tactivos, Inc. and/or its affiliates) and Miro® (Miro and all Miro-based trademarks and logos are trademarks or registered trademarks of RealtimeBoard, Inc. and/or its affiliates). A canvas document may include features that allow users to, for example, draw, paint, post tasks and change the status of those tasks, draw flowcharts, place "sticky notes," share photos and other media, create and modify objects, or use logic to create connections between objects.

In an alternate embodiment, a document may be a web service such as a social network, a collaborative chat group, or any database through which multiple users collaborate.

In a further embodiment, the contextual document collaboration program 150 may identify other shared assets, artifacts, or spaces, such as shared spaces in a video game, a shared social space such as a "metaverse," or a virtual reality platform. For example, a shared asset may include an island town built on a multiplayer online video game server, or the entire video game instance on that server. Alternatively, a shared asset may include a three-dimensional sculpture that multiple users sculpt and paint together on a three-dimensional virtual reality platform.

Identifying a document may include identifying a preexisting document or creating a document for use in the process for providing context for changes to a shared document 200. For example, a document may be created when a meeting is initialized at 204. Identifying may include associating a document with the live meeting at 204.

Identifying a document may include processing the document, including by using machine learning techniques such as natural language processing, topic modeling, sentiment analysis, visual recognition, neural networks, or long short-term memory. For example, the contextual document collaboration program 150 may use visual recognition to divide the document into relevant sections, and may then use a neural network trained on feedback obtained at 210 to determine a topic for each section.

In at least one embodiment, a shared document may be shared over a cloud service or internet document collaboration service. A shared document may be edited synchronously or asynchronously by one or more editors, and may be viewed simultaneously by one or more viewers, who may be able to view edits live, or at one instance. A shared document may maintain its own metadata, a history of edits or changes or similar version history, a list of editors or viewers, or any other useful data.

Then, at 204, the contextual document collaboration program 150 initiates a live meeting. A meeting may be, for example, a call, video conference, presentation, video stream, or chat room. Initializing a meeting may include determining participants, invitees, presenters, moderators, or other relevant users. Initiating a meeting may include identifying a shared document at 202 that is associated with the meeting, including, for example, a document that is shared during the meeting, modified during the meeting, modified based on discussions during the meeting, or is modified before the meeting according to explanations provided during the meeting.

In various embodiments, a meeting may be, for example, a call, video conference, presentation, video stream, or chat room. A meeting may include any combination of audio or video streams, text chat, screen shares, attachments, reactions, or interactive elements such as a direct connection to a shared document. For example, a meeting may be an audio chat service built into a shared canvas service.

Initiating a meeting may include identifying a relationship or association between one or more shared documents identified at 202 to the meeting. For example, a shared document may be identified or shared during the meeting, or on an agenda for the meeting, may be modified during or after the meeting based on a discussion that occurred during the meeting, or may be modified before or during the meeting and those modifications may be explained, given context, or further modified during the meeting.

In at least one embodiment, the contextual document collaboration program 150 may track changes to a shared document in the call. For example, the contextual document collaboration program 150 may map the time each change is made, which users made the changes, or any other information useful for matching or synchronizing changes at 208 to verbal content identified at 206. Tracking changes may further include identifying or processing changes using such techniques as machine learning techniques such as natural language processing, topic modeling, sentiment analysis, visual recognition, neural networks, or long short-term memory. For example, the contextual document collaboration program 150 may use natural language processing techniques to generate a summary of a change to a particular drawing in the shared document.

Initializing a meeting may include determining participants, invitees, presenters, moderators, or other relevant users. Initializing may further include identifying metadata, including data about the participants, a team, department, or company associated with the meeting, the media shared during the meeting, an agenda for the meeting, the time or duration of the meeting, or any other relevant information.

A meeting may be recorded through one or more of the media. For example, the audio may be recorded for a meeting with video and audio, saved to a cloud service, and sent to each person on a team of designers associated with the meeting. The contextual document collaboration program 150 may initialize multiple calls, including calls that overlap with one another at a given time, and store data pertaining to those calls simultaneously.

Next, at 206, the contextual document collaboration program 150 identifies verbal content in the meeting. Verbal content may include, for example, speech over audio, text chat, or text written on the screen. Verbal content may be identified by a process of speech-to-text, visual text recognition, or any other process for identifying text. The contextual document collaboration program 150 may additionally identify other relevant information for providing context regarding changes to the meeting.

Verbal content may include, for example, speech over audio, text chat, text written on a shared screen, or language spoken on video by mouth or by sign language. Verbal content may be identified by a process of speech-to-text, visual text recognition, or any other process for identifying text. For example, the contextual document collaboration program 150 may use a process of artificial intelligence such as use of a trained neural network to process video content to parse visible text, read lips, or understand sign language in order to parse verbal content.

Identifying verbal content may include processing the content of the verbal content using techniques such as natural language processing, natural language understanding, sentiment analysis, and topic modeling. Such processing may be used to, for example, identify topics or sentiments in the verbal content, separate different segments of verbal content by relevance, or match the verbal content to a relevant change to or part of the shared document at 208.

Identifying verbal content may further include identifying metadata about the verbal content, such as the time the verbal content is spoken, written, sent, or otherwise communicated, length or duration of the verbal content, a user or speaker that communicated the verbal content, the language of the verbal content, or the location from which verbal content is communicated.

The contextual document collaboration program 150 may additionally identify other relevant information for providing context regarding changes to the meeting. For example, if a user shares a .GIF attachment in a text chat of a person throwing confetti in the air, the contextual document collaboration program 150 may interpret the .GIF attachment as signifying a strong positive sentiment.

Then, at 208, the contextual document collaboration program 150 synchronizes or matches the identified verbal content to changes made to the document. Verbal content may be matched to a change by proximity in time, by relevance, by metadata, or by a combination thereof. The contextual document collaboration program 150 may further match any other piece of contextual information to a relevant change.

In at least one embodiment, verbal content may be matched or synchronized to a change by proximity in time. For example, if a change is made to flowchart A in a shared canvas document from the 16:40 time stamp to the 18:31 time stamp in the meeting, the change in flow chart A may be matched to the verbal content spoken over audio from the 16:20 time stamp to the 18:51 time stamp, automatically providing 20 seconds of context around the changes, or from the 16:15 time stamp to the 18:44 time stamp, automatically selecting times where relevant users start speaking and stop speaking.

In another embodiment, verbal content may be matched to a change in a shared document based on relevance. For example, if User A says "hey, it looks like you made a typo there," User B changes one letter immediately afterwards, and then says "thank you" followed by User A's name, the contextual document collaboration program 150 may determine, based on use of natural language processing techniques, that User A and User B's comments are relevant to the change of the one letter. Alternatively, if the contextual document collaboration program 150 determines that a change has to do with the way a garment is drawn in a shared graphical document, matching a change may include searching verbal content for a description of that change in the way that garment is drawn.

In yet another embodiment, verbal content may be matched by metadata. For example, if metadata indicates that User C makes a change to slide 4 of a presentation, and verbal content includes a message from User D asking User C to "spice up" slide 4 of the presentation, that verbal content may be matched to the change in slide 4.

Verbal content may be matched or by a combination of one or more of the above factors. For example, the contextual document collaboration program 150 may identify verbal content based on proximity in time to a relevant change, extend verbal content to include full communications from each user according to metadata, and shorten the verbal content to only include verbal content relevant to a change. As a more specific example, if a change is made within proximity of the range from the 16:20 time stamp to the 18:51 time stamp, and meeting presenter E is speaking in the audio from time stamp 18:04 to time stamp 19:33, the verbal content may include audio from 16:20 to 19:33. Furthermore, if it is found that the change has to do with budgeting, but the topic of the verbal content from 16:20 to 17:01 is design, the relevant verbal content may be reduced to only include audio from 17:01 to 19:33.

In an alternate embodiment, the contextual document collaboration program 150 may match changes to verbal content based on user input. User input may include, for example, selecting relevant verbal content while reviewing a change, selecting a relevant change while reviewing verbal content, providing feedback about a proposed match, or inputting keywords to assist the contextual document collaboration program 150 in selecting matches.

The contextual document collaboration program 150 may match any number of pieces or portions of verbal content to any number of changes. For example, if a user is heard saying, "oh no, everything we've changed over the past hour has been wrong," that verbal context may be matched to every change made during the hour before that comment was made.

The contextual document collaboration program 150 may further match any other piece of contextual information to a relevant change. For example, if, immediately after User F makes a change to a flowchart, some verbal content says "good job," and images shared in chat are shown to have positive sentiment, the images may be matched to the change in the flow chart, and the contextual document collaboration program 150 may note a positive sentiment regarding the change in the flowchart.

Next, at 210, the contextual document collaboration program 150 provides contextual information about the changes to a user. Providing contextual information about changes may include providing verbal context that is relevant to a change in or portion of a shared document, or providing a change in or portion of a shared document that is relevant to a particular piece of verbal content. Contextual information may be provided automatically or in response to user input.

In at least one embodiment, contextual information may be provided to a user automatically. For example, a user may follow another user, department, topic, or search term, and be notified of all changes made by the user, by a user in the department, relating to the topic, or corresponding to the search term in the matching verbal context. Alternatively, relevant changes may automatically be sent by a Uniform Resource Identifier (URI) in an email to all members of a particular group, team, or department. As another alternative, while a user listens to an audio recording of a meeting, the contextual document collaboration program 150 may automatically pan across a canvas document to relevant changes that match the verbal content relevant to the present portion of the audio.

In another embodiment, contextual information may be provided in response to user input. For example, a user may search for "budget" to find all changes that match verbal content containing the word budget, or pertaining to the topic of the budget. Alternatively, a user may select a particular box in a flow chart to be provided with context for that box and connected boxes. As another alternative, users listening to an audio recording of a meeting may press a button requesting context when they hear a portion of the meeting they think is interesting or confusing.

In at least one embodiment, providing contextual information to a user may include providing verbal content that is relevant to a particular change in a shared document or a particular portion of the shared document. For example, providing verbal content to a user may include playing audio for a user, providing a user with an audio file, or displaying text to a user.

In another embodiment, providing contextual information to a user may include providing a portion of a shared document, or highlighting a particular change to the portion or to the shared document, that is relevant to a particular keyword, search term, or piece of verbal content. Providing a portion or change may include notifying a user, or highlighting, zooming in on, panning to, scrolling to, or displaying the relevant part of the document in any way. Displaying may further include temporarily reverting a change, for example when a user holds or hovers over a special icon, showing a split-pane view with the pre- and post-changed part of the document in either pane, or differentially highlighting a deleted portion and an added portion.

In a further embodiment, providing contextual information to a user may include providing any other contextual information to a user. For example, if a set of six .GIF and .JPEG attachments are found to match a change, the contextual document collaboration program 150 may display the six relevant attachments in a side pane. Alternatively, the contextual document collaboration program 150 may automatically display a small emoticon indicating overall sentiment next to each object in a shared canvas document, and a user may be able to click on the emoticon to find further context relating to the sentiment about the object, changes in the object, or sentiment about changes in the object.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a shared document;
   initiating a live meeting;
   identifying verbal content in the live meeting;
   identifying one or more changes to the shared document;
   matching a portion of the verbal content to a relevant change in the one or more changes to the shared document; and
   responsive to a user selecting the relevant change in the shared document, providing contextual information to the user based on the matching.

2. The method of claim 1, wherein the shared document is a canvas document.

3. The method of claim 1, wherein the live meeting includes a conversation between two or more participants over audio.

4. The method of claim 1, wherein the one or more changes to the shared document are made during the live meeting.

5. The method of claim 4, wherein the matching is performed based on a proximity in time between the one or more changes and the verbal content.

6. The method of claim 1, wherein the matching is performed using natural language processing of the verbal content.

7. The method of claim 1, wherein the contextual information is provided to the user in response to the user conducting a search for a keyword in the verbal content.

8. A computer system:
   a processor set;
   one or more computer-readable storage media; and
   program instructions stored on the one or more computer-readable storage media to cause the processor set to perform operations comprising:
   identifying a shared document; initiating a live meeting;
   identifying verbal content in the live meeting;
   identifying one or more changes to the shared document;
   matching a portion of verbal content to a relevant change in the one or more changes to the shared document; and
   responsive to a user selecting the relevant change in the shared document, providing contextual information to the user based on the matching.

9. The computer system of claim 8, wherein the shared document is a canvas document.

10. The computer system of claim 8, wherein the live meeting includes a conversation between two or more participants over audio.

11. The computer system of claim 8, wherein the one or more changes to the shared document are made during the live meeting.

12. The computer system of claim 11, wherein the matching is performed based on a proximity in time between the one or more changes and the verbal content.

13. The computer system of claim 8, wherein the matching is performed using natural language processing of the verbal content.

14. The computer system of claim 8, wherein the contextual information is provided to the user in response to the user conducting a search for a keyword in the verbal content.

15. A computer program product, the computer program product comprising:
   one or more computer-readable tangible storage media; and
   program instructions stored on the one or more computer-readable tangible storage media to perform operations comprising:
   identifying a shared document; initiating a live meeting;
   identifying verbal content in the live meeting; identifying one or more changes to the shared document;
   matching a portion of verbal content to a relevant change in the one or more changes to the shared document; and
   responsive to a user selecting the relevant change in the shared document, providing contextual information to the user based on the matching.

16. The computer program product of claim 15, wherein the shared document is a canvas document.

17. The computer program product of claim 15, wherein the live meeting includes a conversation between two or more participants over audio.

18. The computer program product of claim 15, wherein the one or more changes to the shared document are made during the live meeting.

19. The computer program product of claim 18, wherein the matching is performed based on a proximity in time between the one or more changes and the verbal content.

20. The computer program product of claim 15, wherein the matching is performed using natural language processing of the verbal content.

* * * * *